United States Patent
Danilov et al.

(10) Patent No.: US 10,289,488 B1
(45) Date of Patent: May 14, 2019

(54) SYSTEM AND METHOD FOR RECOVERY OF UNRECOVERABLE DATA WITH ERASURE CODING AND GEO XOR

(71) Applicant: EMC IP Holding Company LLC, Hopkinton, MA (US)

(72) Inventors: Mikhail Danilov, Saint Petersburg (RU); Konstantin Buinov, Kirovsk (RU); Alexander Rakulenko, Seattle, WA (US); Gregory Skripko, Seattle, WA (US); Kirill Zakharov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 75 days.

(21) Appl. No.: 15/498,859

(22) Filed: Apr. 27, 2017

(51) Int. Cl.
| | |
|---|---|
| G06F 11/10 | (2006.01) |
| H03M 13/15 | (2006.01) |
| H04L 29/08 | (2006.01) |
| G11C 29/00 | (2006.01) |

(52) U.S. Cl.
CPC .......... *G06F 11/1076* (2013.01); *G11C 29/00* (2013.01); *H03M 13/154* (2013.01); *H04L 67/1097* (2013.01)

(58) Field of Classification Search
CPC ...... H04N 19/89; H04N 7/147; H04L 65/602; H04L 65/607; H04L 67/1097; H03M 13/154; G06F 11/1076
See application file for complete search history.

(56) References Cited

U.S. PATENT DOCUMENTS

| | | | |
|---|---|---|---|
| 2014/0052706 A1* | 2/2014 | Misra ............... | G06F 17/30194 707/698 |
| 2015/0189331 A1* | 7/2015 | Koo ....................... | H04N 19/89 375/240.27 |
| 2016/0378624 A1* | 12/2016 | Jenkins, Jr. ......... | G06F 11/1076 714/6.3 |

* cited by examiner

*Primary Examiner* — Guy J Lamarre
(74) *Attorney, Agent, or Firm* — Womble Bond Dickinson (US) LLP

(57) ABSTRACT

The disclosure relates data protection management (e.g. data recovery) for distributed storage systems. Specifically, the systems (and methods) of the disclosure provide an advanced mechanism for data recovery based on a notion of a data fragment's peer group, which may be used for "peer" recovery. Peer recovery allows a data fragment to be recovered when all the data fragments from its peer group are available. Accordingly, the described mechanism leverages the power of erasure coding and XOR operations to support recovery of data in situations where such data would previously be considered unrecoverable.

17 Claims, 9 Drawing Sheets

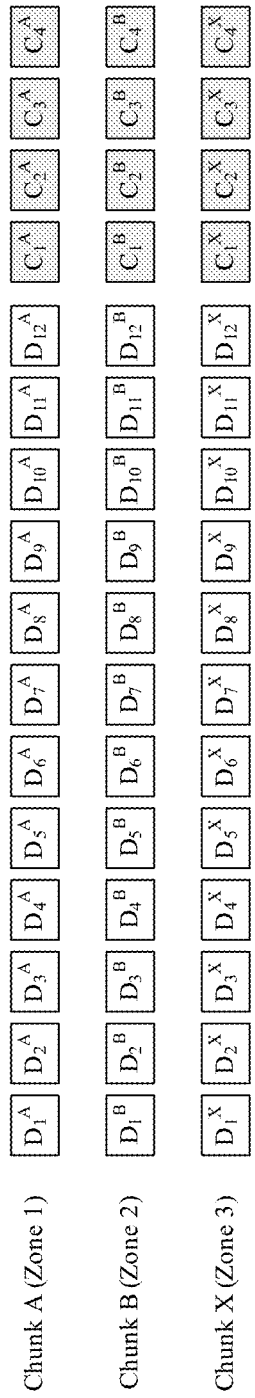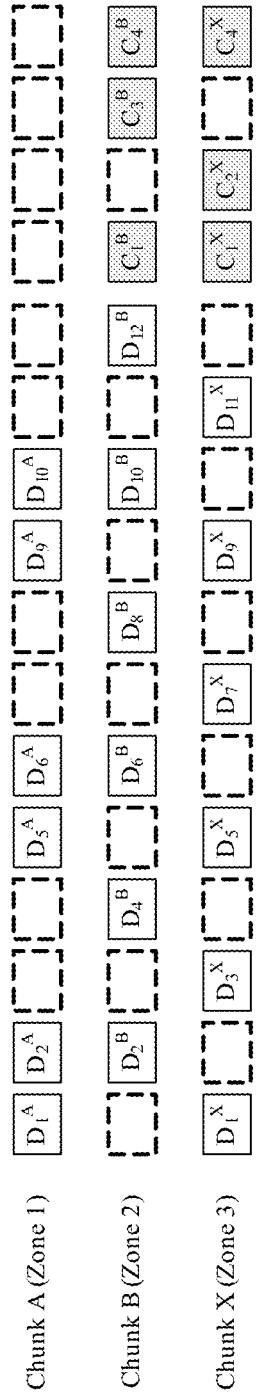

SYSTEM AND METHOD FOR RECOVERY OF UNRECOVERABLE DATA WITH ERASURE CODING AND GEO XOR

TECHNICAL FIELD

Embodiments of the present disclosure relate generally to data storage systems. More particularly, embodiments of the disclosure relate to recovering data within a data storage system.

BACKGROUND

In data storage systems space is allocated for storing a primary set of user data. Additional storage space is allocated for providing data protection for the primary set of data. For example, data protection can include generating a backup copy of the primary data. The backup copy provides protection against data loss in the event of primary data failure.

In geographically distributed data storage systems such as "cloud" storage systems, data protection can include replication to generate copies of primary and backup data and stored independently to provide additional protection. As distributed data storage systems grow in size (e.g. hundreds of zones and clusters), the need to recover from complex failures is critical because the statistical probability of a dual, triple and n zone failures increases as the number of zones increases within a single distributed storage system. Accordingly, there is a continued need to provide efficient mechanisms for recovering data in large-scale distributed data storage systems.

BRIEF DESCRIPTION OF THE DRAWINGS

Embodiments of the disclosure are illustrated by way of example and not limitation in the figures of the accompanying drawings in which like references indicate similar elements.

FIG. 5 is a block diagram illustrating a representation of data fragments from an XOR implementation as shown, for example, in FIG. 4.

FIG. 6 is a block diagram illustrating a representation of lost data fragments as shown in FIG. 5.

DETAILED DESCRIPTION

Figure 1:
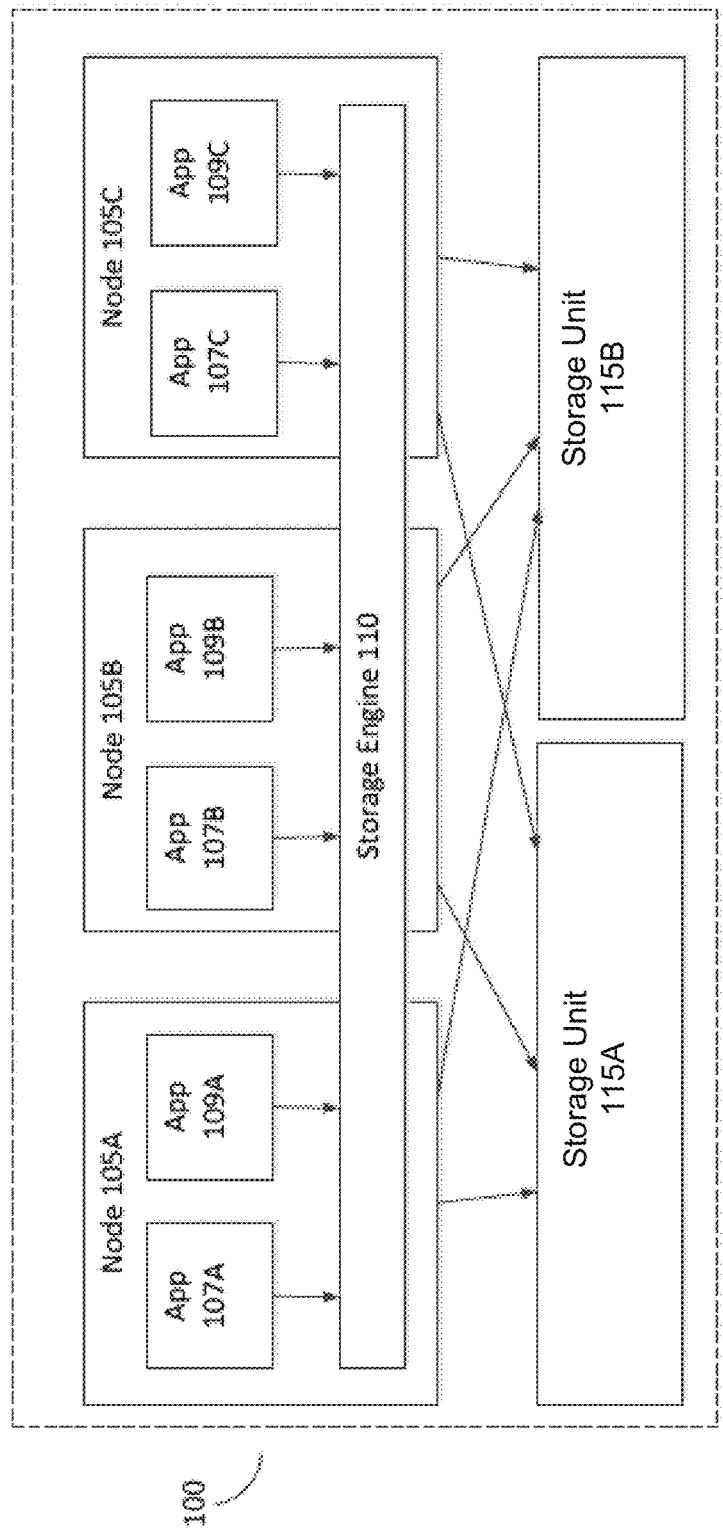
FIG. 1 is a block diagram illustrating an overview of an operating environment of a distributed data storage system according to one embodiment of the disclosure.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

The disclosure relates to data protection management for distributed storage systems. Some distributed storage systems (e.g. the Dell EMC® Elastic Cloud Storage (ECSTM) solutions) employ data protection methodologies that minimize capacity overhead while providing robust data protection. For example, rather than relying on a conventional file system, some systems partition disk space into a set of blocks of fixed size called chunks to manage disk capacity. For example, these chunks may range in size from 64 MB to 128 MB (or more). In some implementations, all user data is stored in these chunks and the chunks are shared meaning that one chunk may (and, in most cases, does) contain fragments of several user objects. For example, chunk content may be modified in append-only mode, and when a chunk becomes full, the chunk is sealed (e.g. content of sealed chunks are immutable).

Storing user data in chunks allows the use of other techniques to minimize capacity overhead while providing robust data protection. For example, for geographically distributed storage, systems may provide additional protection of user data with geo-replication (e.g. "GEO" data protection), in which replication is performed at the chunk level and geographically distributed.

In some implementations of geo-replication, systems may not necessarily employ traditional data protection schemes like mirroring or parity protection. Instead, to address the challenges of reducing the capacity overhead associated with data protection while improving the ability to recover from complex failures of storage infrastructure, some distributed data storage systems implement erasure coding. For example, some systems may implement erasure coding to protect (e.g. re-protect) replicated chunk data efficiently while reducing the storage capacity overhead associated with replication. In this manner, erasure coding enhances data protection scalability in large distributed storage systems, such as cloud-based storage systems, that comprise a plurality of nodes (or zones/clusters).

By way of explanation, as will be described in greater detail with reference to FIG. 2, erasure coding encodes data that has been divided into k data fragments of equal size to create m redundant coding fragments. The encoding assures that the loss of any up to any m fragments of the k+m fragments can be tolerated using basic recovery methods. To recover lost fragments erasure coding decodes the available data fragments and coding fragments.

As further described herein, embodiments of the present disclosure may provide a recovery mechanism when, for example, more than m fragments of data are lost. As further described below, the mechanism may leverage the principles of erasure coding and XOR operations to provide an advanced recovery method to recovery data that would previously be considered "unrecoverable." For example, the mechanism introduces a notion of a data fragment's peer group, which may be used for "peer" recovery. Peer recovery allows a data fragment to be recovered when all (or a certain number) of the data fragments from its peer group are available. Accordingly, the system may perform recovery by performing multiple recovery processes (or steps) using peer recovery methods in conjunction with basic recovery methods.

FIG. 1 illustrates an overview of an operating environment of a distributed data storage system according to one embodiment of the disclosure.

As shown, distributed data storage system 100 includes one or more storage nodes (105A-C, 105 generally), which may include (or connect to) one or more storage units (115A/B, 115 generally). In one embodiment, a node 105 may be a logical unit that may include one or more storage units 115. Storage units 115 may be any suitable storage device for storing data. For example, the storage units 115 may include magnetic disks, solid state disks, optical disks such as CD-ROM or DVD based storage, magnetic tape storage, magneto-optical (MO) storage media, flash memory based devices, or any other type of non-volatile storage devices suitable for storing large volumes of data. Storage units 115 may also be combinations of such devices. In the case of disk storage media, storage units 115 may be organized into one or more volumes of Redundant Array of Inexpensive Disks (RAID). For example, in one embodiment, the system may use RAID-5 (e.g. using XOR encoding) and/or RAID-6 (e.g. Reed-Solomon).

In one embodiment, storage engine 110 may be executed on one or more nodes 105. In one embodiment, storage engine 110 enables applications 107A, 109A, 107B, 109B, 107C, 109C to execute data I/O requests to and from distributed data storage system 100. In various embodiments, a distributed data storage system may include one or more zones or cluster of nodes 105 that may be located in one or more locations. In one embodiment, the distributed data storage system 100 may be part of a cloud-based data storage system. In one embodiment, the distributed data storage system may partition disk space (e.g. storage space) into a set of blocks of fixed size called chunks.

Figure 2:
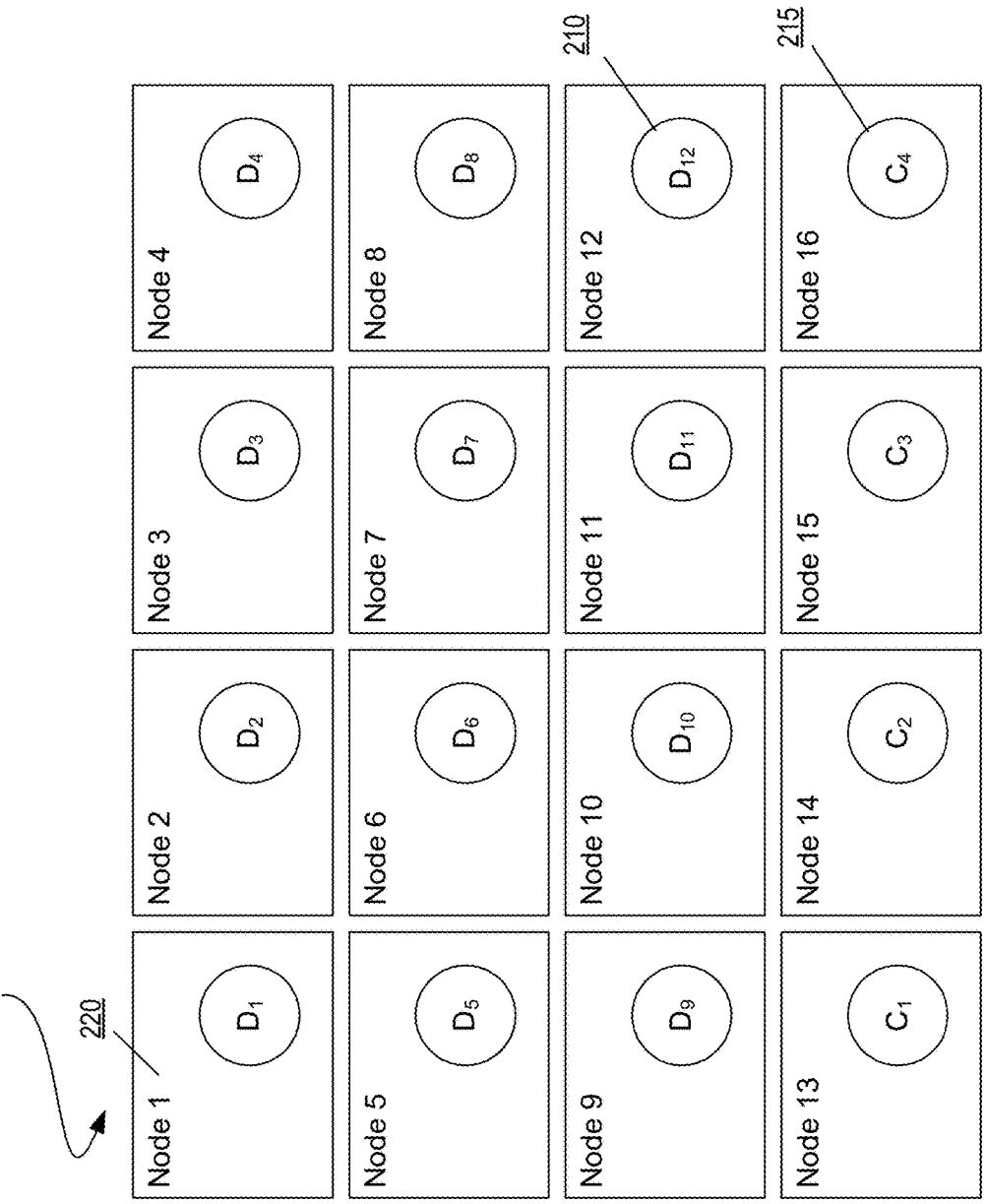
FIG. 2 is a diagram illustrating a layout of fragments for an example erasure coding in a data storage system according to one embodiment of the disclosure.

FIG. 2 is a diagram 200 illustrating an example implementation of erasure coding in a data storage system according to one embodiment of the disclosure. A data block (D) 210 to be protected may be divided into k fragments. During encoding m redundant coding fragments (C) 215 may be created. Therefore, a total of k+m fragments may be stored. In one embodiment, the method of erasure coding ensures that the system can tolerate the loss of any m fragments in the k+m fragments stored. In other words, the missing or corrupt fragments can be recovered (using basic recovery) based on the remaining fragments as long as no more than m fragments are invalid. In one embodiment, the coding scheme may be 12+4 (i.e. k equals to 12 and m equals to 4).

As shown in this example, there are 16 nodes 220 (e.g. Node 1, Node 2 . . . Node 16) and 16 fragments (D1, D2 . . . D12, C1, C2, C3, and C4) to be stored. In one embodiment, each node may store only one fragment. In other embodiments (not shown), one node may store multiple fragments. As described, when some fragments are missing, the missing fragments may be restored via a decoding operation. In embodiments described herein, the data protection mechanism may implement various variants of a matrix-based erasure coding.

Figure 3:
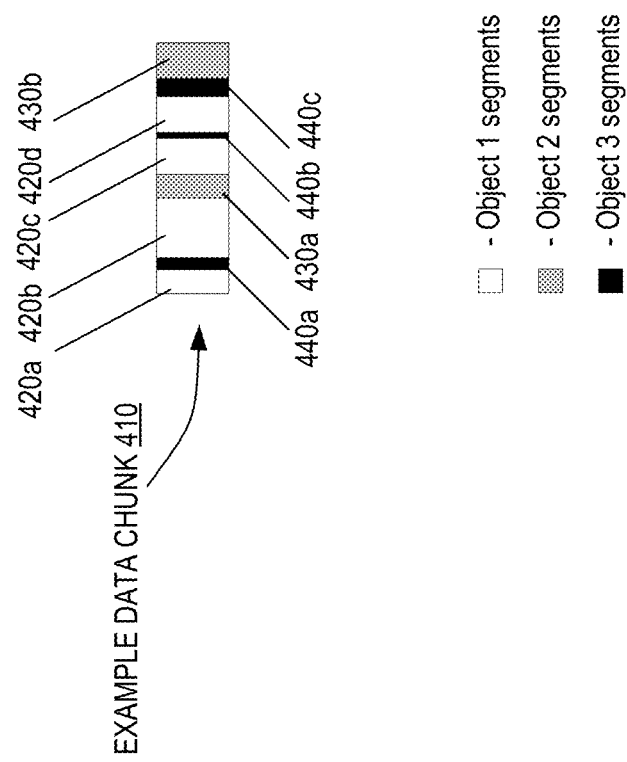
FIG. 3 is a block diagram illustrating an example of a data chunk used in conjunction with one or more embodiments of a distributed data storage system as described herein.

FIG. 3 is a block diagram illustrating an example of a data chunk that may be used in conjunction with one or more embodiments of a data storage system as described herein. In one embodiment, a chunk 410 may contain mixed segments of several user data objects. As shown, chunk 410 may contain segments 420a, 420b, 420c, 420d that belong to Object 1, segments 430a, 430b that belong to Object 2, and segments 440a, 440b, 440c that belong to Object 3. A user data object may be stored as a set of segments that reside in several chunks. In addition, chunk content may be modified in append-only mode, and when a chunk becomes full, the chunk may be sealed (e.g. content of sealed chunks is immutable). As described herein, data chunks may be protected with erasure coding, and may be recovered using the mechanisms described herein.

As described, in one embodiment, the data storage system may support geographically distributed setups including two or more zones (or clusters). For example, GEO-replication may be used to provide an additional protection of user data. In one embodiment, a distributed data storage system may implement an XOR (eXclusive OR) technique to minimize capacity overhead associated with this additional data protection.

Figure 4:
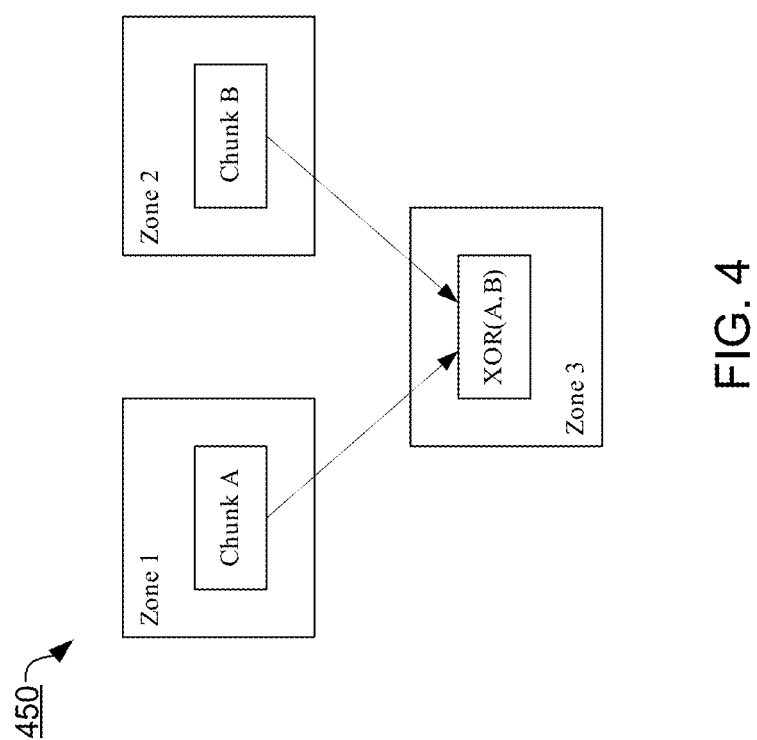
FIG. 4 is a block diagram illustrating an example overview of an XOR implementation using various zones within a distributed data storage system according to one embodiment of the disclosure.

FIG. 4 is a block diagram 450 illustrating an example overview of an XOR implementation using various zones within a distributed data storage system according to one embodiment of the disclosure.

As shown in this example, XOR may be implemented in configurations including three or more zones (or clusters). This example includes three zones: Zone 1, Zone 2, and Zone 3. Accordingly, Zone 1 replicates Chunk A to Zone 3, Zone 2 replicates Chunk B to Zone 3 as well. Zone 3, however, does not store two chunk copies for Chunk A and Chunk B, instead, only one chunk is stored. As shown, content of this chunk, which may be referred to as Chunk X, is the result of an XOR (eXclusive OR) operation for Chunk A user data and Chunk B user data. Accordingly, the operation may be described as:

$$\text{Chunk}X = \text{XOR}(\text{Chunk}A, \text{Chunk}B)$$

Accordingly, when a given chunk with user data (e.g. Chunk A or Chunk B), becomes unavailable, the corresponding XOR chunk may be used to restore its content. This mechanism may be called recovery (or "basic" recovery). In one embodiment, a chunk is unavailable when it is completely lost or some its fragments are lost and the number of remaining fragments (n) is not enough to perform decoding (e.g. n<k).

Thus, in one embodiment, GEO recovery (or performing recovery) may be represented with the formulas:

$$\text{Chunk } A = \text{XOR}(\text{Chunk } X, \text{Chunk } B)$$

Or $$\text{Chunk}B = \text{XOR}(\text{Chunk}A, \text{Chunk}X)$$

As shown from the formulas above, the system may survive the unavailability of only a single chunk. For example, if Chunk A (or Chunk B) is unavailable, there must be Chunk X and Chunk B (or Chunk A) available to perform basic data recovery. Typically, a data storage system does not merely lose data, but hardware failures (e.g. disks and nodes) and data corruption are often unavoidable. In some cases, a massive number of chunks become unavailable because too many fragments are lost. Accordingly, there are instances where it is possible to have two or more unavailable chunks from a loss of data. For example, probability of such an event is higher when two or more zones/clusters are deployed in one data center. As described above, embodiments of the present disclosure may provide a recovery mechanism when two or more chunks are unavailable. As further described below, the mechanism described herein leverages the principles of erasure coding and GEO XOR in combination to provide an advanced recovery method to recovery data that would previously be considered "unrecoverable" using only the basic recovery method described above. Specifically, the mechanism described below uses a "peer" recovery method in conjunction with "basic" recovery methods.

The example systems described below show an implementation with three zones/clusters with all zones implementing the same erasure coding scheme (e.g. 12+4). However, it should be clear the system may utilize any number of zones including various other coding schemes.

FIGS. 5-10 illustrate an example data recovery by the mechanisms of the present disclosure from a scenario of data loss that would previously be unrecoverable using basic recovery methods alone.

FIG. 5 is a block diagram 500 illustrating a representation of data fragments from an XOR implementation as shown, for example, in FIG. 4.

As shown, Chunk A is stored in Zone 1, Chunk B is stored in Zone 2, and Chunk X is stored in Zone 3, which is an XOR chunk for Chunk A and Chunk B. As shown, each chunk is represented as a set of 12 data fragments and 4 coding fragments, for example, as shown in FIG. 2.

FIG. 6 is a block diagram 600 illustrating a representation of lost data fragments as shown in FIG. 5. For example, particular data and coding fragments may be lost in response to a particular event (e.g. power failure that causes multiple hardware failures).

As shown, 24 fragments out of the 48 total fragments are lost (e.g. half of the fragments). As shown, all the chunks (A, B, and X) are unavailable. As described above, each chunk needs at least 12 data and coding fragments to be recoverable using basic recovery. However, chunks A, B, and X only have 6, 9, and 9 respective data and coding fragments available (e.g. more than m lost fragments). Accordingly, the system is unrecoverable using basic recovery methods.

However, the "unrecoverable" data may be recovered using the mechanism of the present disclosure. In one embodiment, the objective is to recover Chunk A and Chunk B using the remaining fragments of the three chunks. Because Chunk X is a redundant portion of data created for data protection needs, the recovery of Chunk X may be an auxiliary objective.

The mechanisms described herein may introduce a notion of data fragment's peer group, which may be used for "peer" recovery. For example, suppose there are a set of N+1 chunks connected with an XOR, which is N chunks with user data and 1 XOR chunk. Then suppose there is a data fragment that belongs to one of the chunks from the set. The peer group of this data fragment is formed by data fragments with the same sequence number (or index value) that belong to other N user data and XOR chunks from the original set of chunks. Using such a premise, content of any data fragment may be recovered when all the data fragments from its peer group are available. In one embodiment, this may be done using the XOR operation.

The mechanism may be performed using several recovery processes (or steps). Accordingly, the system may apply an iterative XOR and erasure coding data recovery process that completes either when all the missing data has been recovered, or when no more data and/or coding fragments are recovered during a recovery process (e.g. step). In one embodiment, the mechanism (or process) may include four types of recovery.

Figure 7:
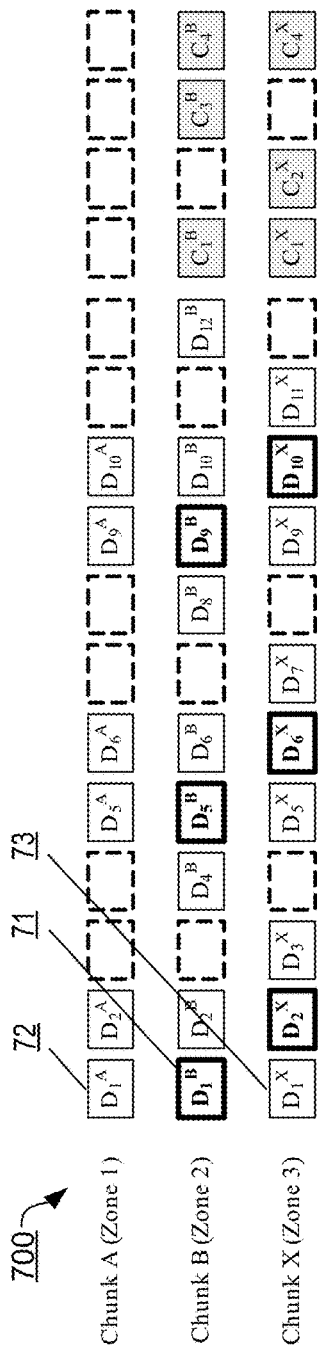
FIG. 7 is a block diagram illustrating a representation of recovered data fragments after performing a first peer recovery of the lost fragments as shown in FIG. 6.

A first recovery process (or step 1) may recover previously unrecoverable data fragments (e.g. unrecoverable via basic recovery) using a peer group recovery. FIG. 7 is a block diagram 700 illustrating a representation of recovered data fragments after performing a first peer recovery of the lost fragments as shown in FIG. 6. As shown, it is possible to recover six data fragments of Chunk B and Chunk X. (Chunk A is not improved). As shown in this example, data fragments are recovered using fragments within corresponding peer groups. For example, data fragment 71 at index 1 of Chunk B is recovered using data fragment 72 at index 1 of Chunk A and data fragment 73 at index 1 of Chunk X. Similarly, data fragments within peer groups 2, 5, 6, 9, and 10 (e.g. index values or positions with the sequence) are also recovered. As shown, Chunk B now has no more than m lost fragments, but Chunk A still has more than m lost fragments.

Figure 8:
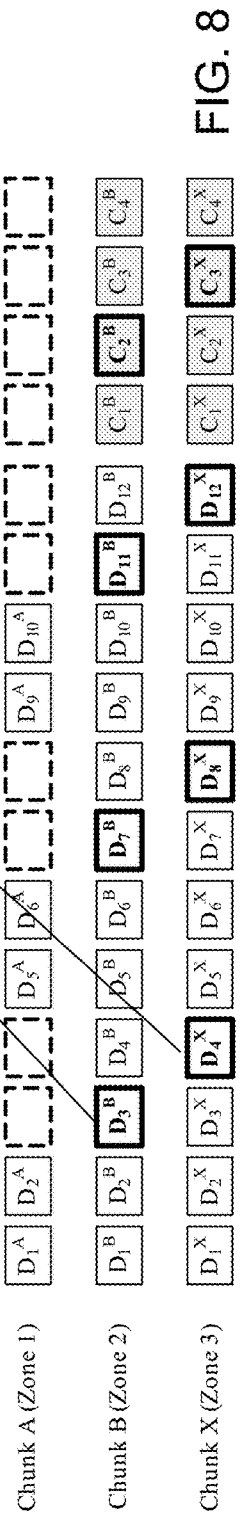
FIG. 8 is a block diagram illustrating a representation of recovered data fragments after performing a first basic recovery from the recovered fragments as shown in FIG. 7.

A second recovery process (or step 2) may recover data and/or coding fragments of chunks that became recoverable after the first recovery process (step 1) using a decoding operation (or basic recovery). FIG. 8 is a block diagram 800 illustrating a representation of recovered data fragments after performing a first basic recovery from the recovered fragments as shown in FIG. 7. As shown in this example, it is possible to recover eight data and coding fragments of Chunk B (e.g. data fragment 81 at index 3 as one of the fragments) and Chunk X (e.g. data fragment 82 at index 4 as one of the fragments).

Figure 9:
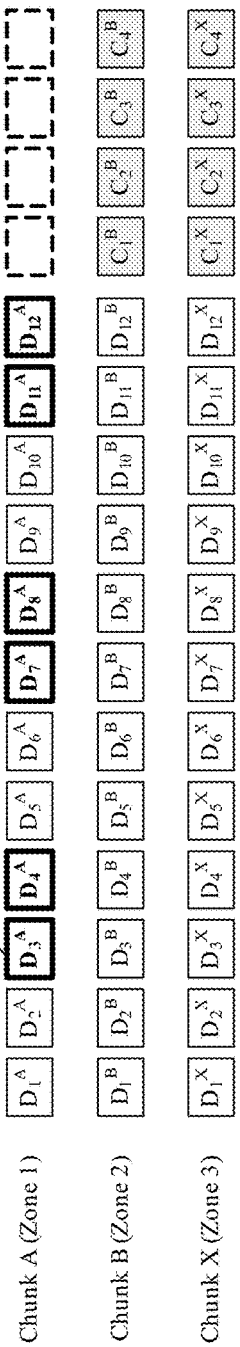
FIG. 9 is a block diagram illustrating a representation of recovered data fragments after performing a second peer recovery from the recovered fragments as shown in FIG. 8.

A third recovery process (or step 3) may use data fragments recovered during the second recovery (or step 2) to recover additional data fragments previously unrecoverable (e.g. unrecoverable via basic recovery). An additional (or second) peer recovery is possible because data fragments recovered during the second recovery populate data within particular peer groups allowing additional data fragments to be recovered using peer recovery. FIG. 9 is a block diagram 900 illustrating a representation of recovered data fragments after performing a second peer recovery from the recovered fragments as shown in FIG. 8. As shown in this example, it is possible to recover four data fragments of Chunk A (see e.g. data fragment 91 at index 3 as one of the fragments).

Figure 10:
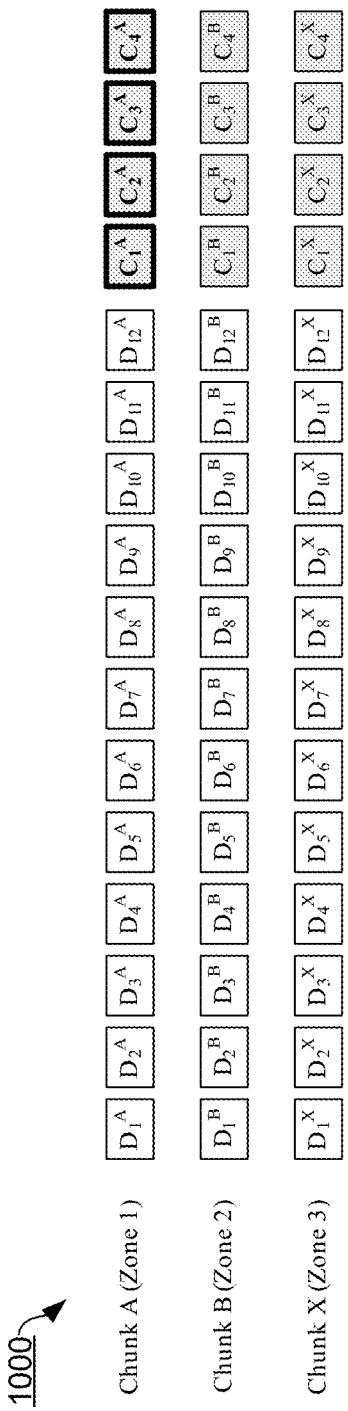
FIG. 10 is a block diagram illustrating a representation of recovered data fragments after performing a re-encoding of data from the recovered fragments as shown in FIG. 9.

A fourth recovery or re-encoding (or step 4) may re-encode (or re-protect) under-protected chunks using an encoding operation. FIG. 10 is a block diagram 1000 illustrating a representation of recovered data fragments after performing a re-encoding of data from the recovered fragments as shown in FIG. 9. As shown in this example, the coding fragments of Chunk A may be re-encoded from data fragments recovered in the recovery processes (or steps) described above.

It should be noted that the recovery process might differ in terms of the ordering of processes or steps. For example, the process may include additional steps (e.g. iterations) or fewer steps, and may even perform steps in a differing order depending on the data to be recovered (e.g. additional peer or basic recoveries in various order).

As described, the recovery process (or mechanism) allows for complete data recovery in situations that were previously considered unrecoverable. Moreover, even when complete data recovery is not possible, the recovery processes may be used to recover as many data fragments as possible, which may still reduce the number of impacted user objects.

Figure 11:
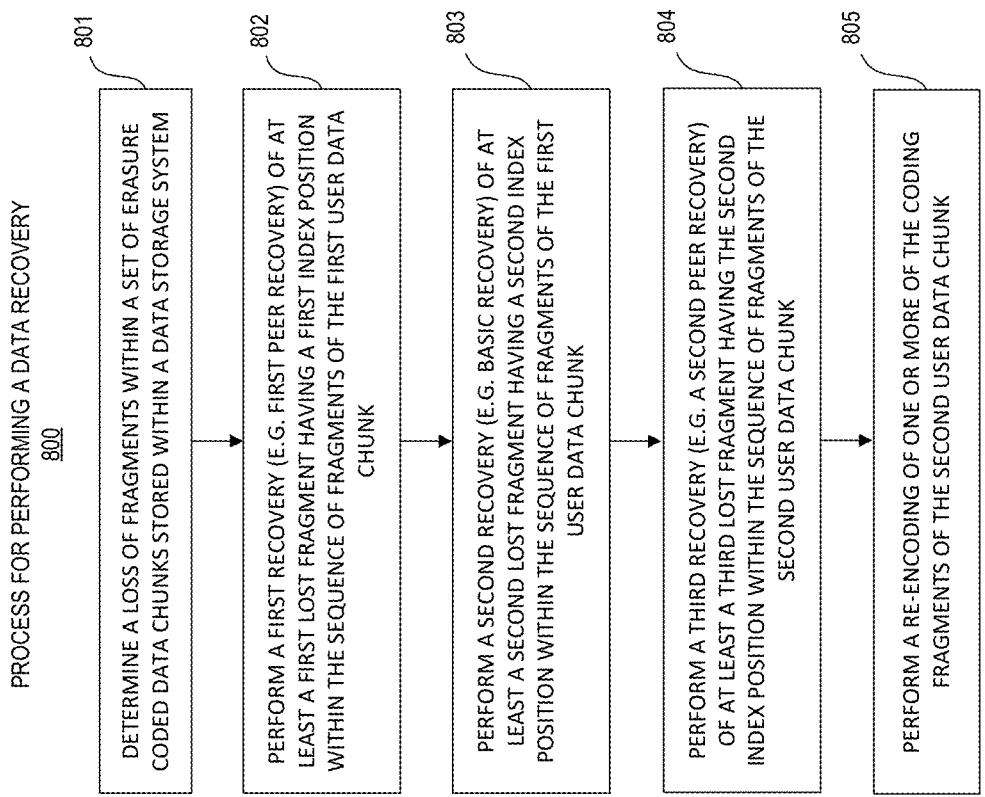
FIG. 11 is an example flow diagram of a process for performing data recovery according to one embodiment of the disclosure.

FIG. 11 is an example flow diagram illustrating a method of performing data recovery according to an embodiment of the disclosure. Process 800 may use processing logic, which may include software, hardware, or a combination thereof. For example, process 800 may be performed by one or more components of a system (e.g. system 100, storage engine 110, one or more nodes 105, zones, etc.).

In 801, the process may include determining a loss of fragments within a set of erasure coded data chunks stored within a data storage system. The set of data chunks may include at least a first and second user data chunk, and a redundant data chunk (e.g. Chunk B, Chunk A, and Chunk X respectively). In one embodiment, the fragments of each of the data chunks includes an indexed sequence of k data fragments and m coding fragments. In one embodiment, the redundant chunk is formed as a result of performing an XOR operation from the fragments of the first and second user data chunks.

The system may recover one or more of the lost fragments within the set of data chunks by performing multiple recovery processes. In 802, the process may include performing a first recovery (e.g. first peer recovery) of at least a first lost fragment having a first index position within the sequence of fragments of the first user data chunk. The first recovery may include performing an XOR operation from a data fragment at the first index position from each of the second user data chunk and the redundant chunk (see e.g. FIG. 7 after performing a first peer recovery). In one embodiment, the first recovery may be performed in response to the first user data chunk having more than m lost data fragments.

In 803, the process may include performing a second recovery (e.g. basic recovery) of at least a second lost fragment having a second index position within the sequence of fragments of the first user data chunk. The second recovery may include performing an operation using at least the recovered first lost fragment and one or more other fragments within the first user data chunk (see e.g. FIG. 8 after performing a basic recovery). In one embodiment, the second recovery is capable of being performed in response to the first user data chunk having no more than m lost data fragments after performing the first recovery.

In 804, the process may include performing a third recovery (e.g. a second peer recovery) of at least a third lost fragment having the second index position within the sequence of fragments of the second user data chunk. The third recovery may include performing an operation using at least the recovered second lost fragment of the first user data chunk, and a data fragment at the second index position within the redundant chunk (see e.g. FIG. 9 after performing a second peer recovery).

In one embodiment, the third recovery is capable of being performed in response to performing the recovery of the second lost fragment. In addition, in one embodiment, the second user data chunk has more than m lost data fragments before performing the third recovery, and no more than m lost data fragments after performing the third recovery.

In 805, the process may include performing a re-encoding of one or more of the coding fragments of the second user data chunk in response to performing the recovery of at least the third lost fragment within the second user data chunk (see e.g. FIG. 10 after performing a re-encoding).

It should be noted that there may be variations to the flow diagrams or operations (or steps) described therein without departing from the embodiments described herein. For example, the operations may be performed in parallel, simultaneously, a differing order, or operations may be added, deleted, or modified.

Figure 12:
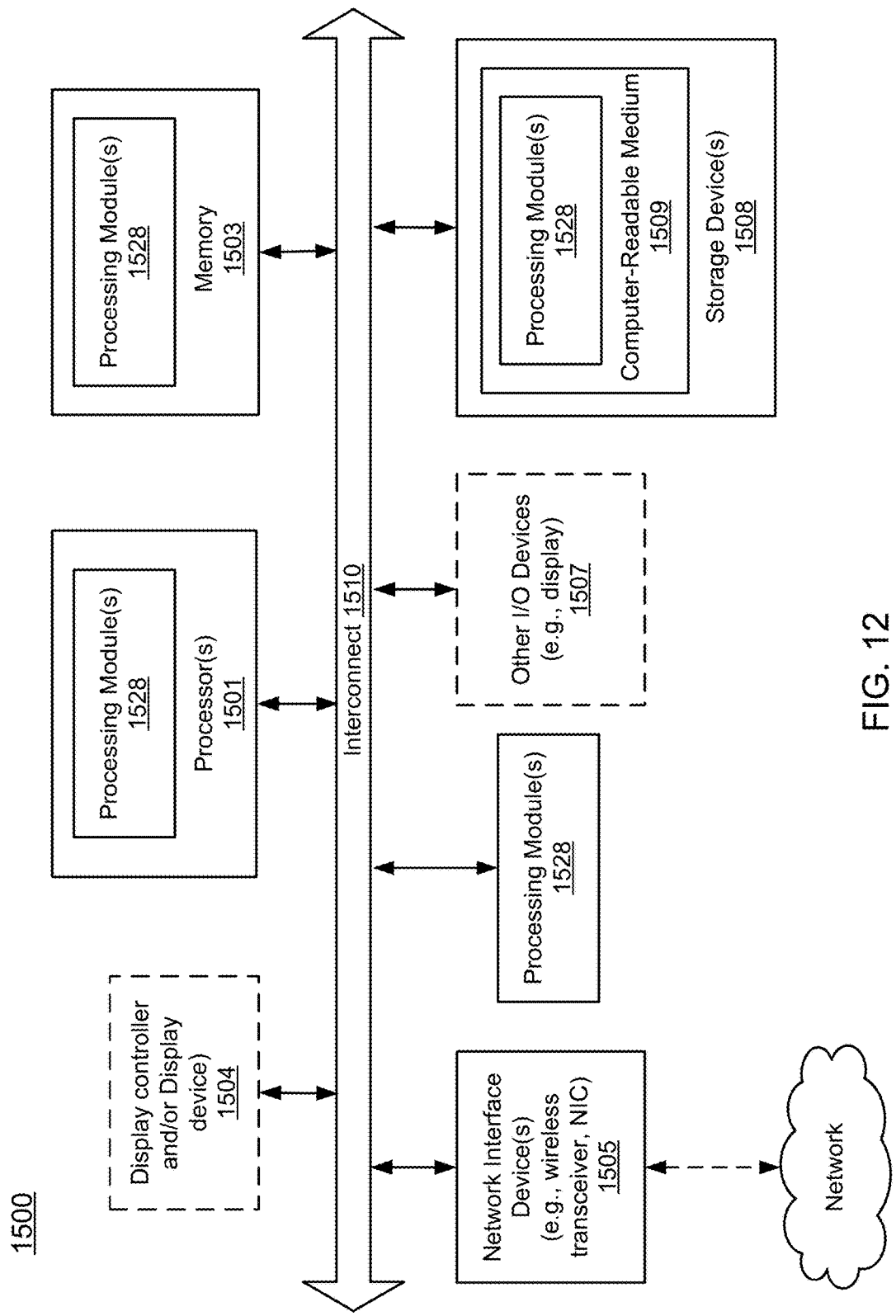
FIG. 12 is a block diagram illustrating an example computing system that may be used in conjunction with one or more embodiments of the disclosure.

FIG. 12 is a block diagram illustrating an example computing system that may be used in conjunction with one or more embodiments of the disclosure.

For example, system 1500 may represent any of data processing systems described above performing any of the processes or methods described above, such as, for example, one or more components shown in configuration 100 (e.g. system 100, storage engine 110, nodes 105, storage unit 115, etc.). System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

IO devices 1507 may include various electronic displays (e.g., a monitor having a screen, a small LCD touch-screen or any other electrical device that is operable to display information), audio output (such as speakers).

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. storage engine 110, applications 107-109, nodes 105 etc.). Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations comprising:
   determining a loss of fragments within a set of erasure coded data chunks stored within a data storage system, wherein the set of data chunks includes at least a first and second user data chunk, and a redundant data chunk, wherein the fragments of each of the data chunks includes an indexed sequence of k data fragments and m coding fragments, wherein the redundant chunk is formed as a result of performing an XOR operation from the fragments of the first and second user data chunks; and
   recovering one or more of the lost fragments within the set of data chunks, including
      performing a first recovery of at least a first lost fragment having a first index position within the sequence of fragments of the first user data chunk, wherein the first recovery includes performing an XOR operation from a data fragment at the first index position from each of the second user data chunk and the redundant chunk,
      performing a second recovery of at least a second lost fragment having a second index position within the sequence of fragments of the first user data chunk,
      performing a third recovery of at least a third lost fragment having the second index position within the sequence of fragments of the second user data chunk,
      performing a re-encoding of one or more of the coding fragments of the second user data chunk in response to performing the recovery of at least the third lost fragment within the second user data chunk.

2. The medium of claim 1, wherein the first recovery is performed in response to the first user data chunk having more than m lost data fragments.

3. The medium of claim 1, wherein the second recovery includes performing an operation using at least the recovered first lost fragment and one or more other fragments within the first user data chunk.

4. The medium of claim 3, wherein the second recovery is performed in response to the first user data chunk having no more than m lost data fragments after performing the first recovery.

5. The medium of claim 1, wherein the third recovery includes performing an operation using at least the recovered second lost fragment of the first user data chunk, and a data fragment at the second index position within the redundant chunk.

6. The medium of claim 5, wherein the third recovery is performed in response to performing the recovery of the second lost fragment, and wherein the second user data chunk has more than m lost data fragments before performing the third recovery, and no more than m lost data fragments after performing the third recovery.

7. A method of recovering data with a data storage system, comprising:
   determining a loss of fragments within a set of erasure coded data chunks stored within a data storage system, wherein the set of data chunks includes at least a first and second user data chunk, and a redundant data chunk, wherein the fragments of each of the data chunks includes an indexed sequence of k data fragments and m coding fragments;
   recovering one or more of the lost fragments within the set of data chunks, including
      performing a first recovery of at least a first lost fragment having a first index position within the sequence of fragments of the first user data chunk, wherein the first recovery includes performing an operation from a data fragment at the first index position from each of the second user chunk and the redundant chunk,
      performing a second recovery of at least a second lost fragment having a second index position within the sequence of fragments of the first user data chunk, wherein the second recovery includes performing an operation using at least the recovered first lost fragment and one or more other fragments within the first user data chunk, and
      performing a third recovery of at least a third lost fragment having the second index position within the sequence of fragments of the second user data chunk, wherein the third recovery includes performing an operation using at least the recovered second lost fragment of the first user data chunk, and a data fragment at the second index position within the redundant chunk,
      performing a re-encoding of one or more of the coding fragments of the second user data chunk in response to performing the recovery of at least the third lost fragment within the second user data chunk.

8. The method of claim 7, wherein the redundant chunk is formed as a result of performing an XOR operation from the fragments of the first and second user data chunks.

9. The method of claim 7, wherein the operations performed in the first, second, and third recovery include an XOR operation.

10. The method of claim 7, wherein the first recovery is performed in response to the first user data chunk having more than m lost data fragments, and wherein the second recovery is performed in response to the first user data chunk having no more than m lost data fragments after performing the first recovery.

11. The method of claim 7, wherein the third recovery is performed in response to performing the recovery of the second lost fragment, and wherein the second user data chunk has more than m lost data fragments before performing the third recovery, and no more than m lost data fragments after performing the third recovery.

12. A data storage system, comprising:
a memory storing instructions; and
one or more processors coupled to the memory to execute the instructions from the memory, the one or more processors being configured to perform operations, the operations comprising:
determining a loss of fragments within a set of erasure coded data chunks stored within the data storage system, wherein the set of data chunks includes at least a first and second user data chunk, and a redundant data chunk, wherein the fragments of each of the data chunks includes an indexed sequence of k data fragments and m coding fragments; and
recovering one or more of the lost fragments within the set of data chunks, including
performing a first recovery of at least a first lost fragment having a first index position within the sequence of fragments of the first user data chunk, wherein the first recovery includes performing an XOR operation from a data fragment at the first index position from each of the second user data chunk and the redundant chunk,
performing a second recovery of at least a second lost fragment having a second index position within the sequence of fragments of the first user data chunk,
performing a third recovery of at least a third lost fragment having the second index position within the sequence of fragments of the second user data chunk,
performing a re-encoding of one or more of the coding fragments of the second user data chunk in response to performing the recovery of at least the third lost fragment within the second user data chunk.

13. The system of claim 12, wherein the second recovery includes performing an operation using at least the recovered first lost fragment and one or more other fragments within the first user data chunk.

14. The system of claim 13, wherein the first recovery is performed in response to the first user data chunk having more than m lost data fragments, and wherein the second recovery is performed in response to the first user data chunk having no more than m lost data fragments after performing the first recovery.

15. The system of claim 12, wherein the third recovery includes performing an operation using at least the recovered second lost fragment of the first user data chunk, and a data fragment at the second index position within the redundant chunk.

16. The system of claim 15, wherein the third recovery is performed in response to performing the recovery of the second lost fragment, and wherein the second user data chunk has more than m lost data fragments before performing the third recovery, and no more than m lost data fragments after performing the third recovery.

17. The system of claim 12, wherein the redundant chunk is formed as a result of performing an XOR operation from the fragments of the first and second user data chunks, and wherein the operations performed in the first, second, and third recovery include an XOR operation.

* * * * *